(12) United States Patent
Yu et al.

(10) Patent No.: US 12,184,940 B2
(45) Date of Patent: Dec. 31, 2024

(54) BULLET-SCREEN COMMENT DISPLAY

(71) Applicant: SHANGHAI BILIBILI TECHNOLOGY CO., LTD., Shanghai (CN)

(72) Inventors: Zixun Yu, Shanghai (CN); Yicong Mei, Shanghai (CN); Guojia Chen, Shanghai (CN)

(73) Assignee: Shanghai Bilibili Technology Co., Ltd., Shanghai (CN)

(*) Notice: Subject to any disclaimer, the term of this patent is extended or adjusted under 35 U.S.C. 154(b) by 0 days.

(21) Appl. No.: 18/139,577

(22) Filed: Apr. 26, 2023

(65) Prior Publication Data

US 2023/0412889 A1 Dec. 21, 2023

(30) Foreign Application Priority Data

Jun. 20, 2022 (CN) .......................... 202210696412.8

(51) Int. Cl.
*H04N 21/4788* (2011.01)
*H04N 21/472* (2011.01)

(52) U.S. Cl.
CPC ... *H04N 21/4788* (2013.01); *H04N 21/47217* (2013.01)

(58) Field of Classification Search
CPC .......... H04N 21/4788; H04N 21/47217; G06F 16/489; G06F 9/451; G06F 16/438
USPC ........................................................ 725/105
See application file for complete search history.

(56) References Cited

U.S. PATENT DOCUMENTS

| | | | |
|---|---|---|---|
| 2017/0171601 A1* | 6/2017 | Cui ................... | H04N 21/4884 |
| 2020/0029119 A1* | 1/2020 | Wang ................. | H04N 21/4318 |
| 2021/0185386 A1* | 6/2021 | Kong ................. | H04N 21/4394 |
| 2022/0103904 A1* | 3/2022 | Sun ................... | H04N 21/47205 |

* cited by examiner

*Primary Examiner* — Adil Ocak
(74) *Attorney, Agent, or Firm* — McAndrews, Held & Malloy, Ltd.

(57) ABSTRACT

This application provides a bullet-screen comment display method. The method includes: obtaining a bullet-screen comment list corresponding to a media resource based on a playback request of the media resource; determining a target bullet-screen comment quantity of the media resource in each unit of time based on a release time of a target bullet-screen comment in the bullet-screen comment list; calculating a wave peak moment of the target bullet-screen comment based on the target bullet-screen comment quantity in each unit of time; processing the target bullet-screen comment in the bullet-screen comment list based on the wave peak moment; and in response to determining that the media resource is played, returning a processed bullet-screen comment list to display a bullet-screen comment in the processed bullet-screen comment list in a playback process of the media resource.

18 Claims, 6 Drawing Sheets

BULLET-SCREEN COMMENT DISPLAY

CROSS-REFERENCE TO RELATED APPLICATION

The present application claims priority to Chinese Patent Application No. 202210696412.8, filed with the China National Intellectual Property Administration on Jun. 20, 2022, which is incorporated herein by reference in its entirety.

TECHNICAL FIELD

This application relates to the field of computer technologies, and in particular, to a bullet-screen comment display method, a computing device, and a non-transitory computer storage medium.

BACKGROUND

With continuous development of multimedia technologies and a requirement of a user for entertainment of a media resource, currently, a bullet-screen comment function is set on a plurality of multimedia platforms. When watching a media resource, the user may comment in a bullet-screen comment manner to communicate with another user, and increase entertainment of a multimedia resource.

SUMMARY

According to an aspect of embodiments of this application, a bullet-screen comment display method is provided, including:
  obtaining a bullet-screen comment list corresponding to a media resource based on a playback request of the media resource;
  determining a target bullet-screen comment quantity of the media resource in each unit of time based on a release time of a target bullet-screen comment in the bullet-screen comment list;
  calculating a wave peak moment of the target bullet-screen comment based on the target bullet-screen comment quantity in each unit of time;
  processing the target bullet-screen comment in the bullet-screen comment list based on the wave peak moment; and
  in response to determining that the media resource is played, returning a processed bullet-screen comment list to display a bullet-screen comment in the processed bullet-screen comment list in a playback process of the media resource.

According to another aspect of embodiments of this application, a computing device is provided, including one or more processors; and
  a memory, storing one or more programs configured to be executed by the one or more processors, the one or more programs including instructions for:
  obtaining a bullet-screen comment list corresponding to a media resource based on a playback request of the media resource;
  determining a target bullet-screen comment quantity of the media resource in each unit of time based on a release time of a target bullet-screen comment in the bullet-screen comment list;
  calculating a wave peak moment of the target bullet-screen comment based on the target bullet-screen comment quantity in each unit of time;
  processing the target bullet-screen comment in the bullet-screen comment list based on the wave peak moment; and
  in response to determining that the media resource is played, returning a processed bullet-screen comment list to display a bullet-screen comment in the processed bullet-screen comment list in a playback process of the media resource.

According to still another aspect of embodiments of this application, a non-transitory computer storage medium is provided, where the non-transitory storage medium stores one or more programs including instructions that, when executed by one or more processors of a computing device, cause the computing device to perform operations including:
  obtaining a bullet-screen comment list corresponding to a media resource based on a playback request of the media resource;
  determining a target bullet-screen comment quantity of the media resource in each unit of time based on a release time of a target bullet-screen comment in the bullet-screen comment list;
  calculating a wave peak moment of the target bullet-screen comment based on the target bullet-screen comment quantity in each unit of time;
  processing the target bullet-screen comment in the bullet-screen comment list based on the wave peak moment; and
  in response to determining that the media resource is played, returning a processed bullet-screen comment list to display a bullet-screen comment in the processed bullet-screen comment list in a playback process of the media resource.

The foregoing description is merely an overview of the technical solutions of this application. To better understand the technical means of this application, the foregoing description may be implemented based on content of the specification, and to more clearly and easily understand the foregoing and another objective, feature, and advantage of this application, the following describes a specific implementation of this application.

BRIEF DESCRIPTION OF DRAWINGS

Other advantages and benefits will become apparent to a person of ordinary skill in the art by reading the following detailed descriptions of implementations. The accompanying drawings are merely intended to describe the implementations, but not intended to limit this application. In addition, throughout the accompanying drawings, same reference symbols are used to denote same components.

In the accompanying drawings.

DETAILED DESCRIPTION OF EMBODIMENTS

The following describes example embodiments of this application in more detail with reference to the accompanying drawings. Although the example embodiments of this application are shown in the accompanying drawings, it should be understood that this application may be implemented in various forms without being limited by the embodiments described herein. On the contrary, these embodiments are provided to have a more thorough understanding of this application, and the scope of this application can be fully communicated to a person skilled in the art.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should also be understood that, the term "and/or" used in one or more embodiments of this application indicates and includes any or all possible combinations of one or more associated listed items.

It should be understood that, although terms such as "first" and "second" may be used in one or more embodiments of this application to describe various types of information, the information is not limited to these terms. These terms are only used to differentiate between information of the same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

The inventor of the present application finds that the user can release an anomalous bullet-screen comment or a specific text bullet-screen comment for the media resource. However, these bullet-screen comments has a negative impact on watching experience of the media resource. For example, the user sends such bullet-screen comments at a time point with an inappropriate atmosphere. Alternatively, the user performs continuous bullet-screen comment exploding from the beginning to the end.

In the solution provided in embodiments of this application, the wave peak moment of the target bullet-screen comment is calculated based on the target bullet-screen comment quantity, and the target bullet-screen comment in the bullet-screen comment list is processed based on the wave peak moment, so that a quantity and a time point of exposure of the target bullet-screen comment are effectively controlled, a problem of target bullet-screen comment exploding and contamination is resolved from the source, and watching experience of the bullet-screen comment is improved.

Figure 1:
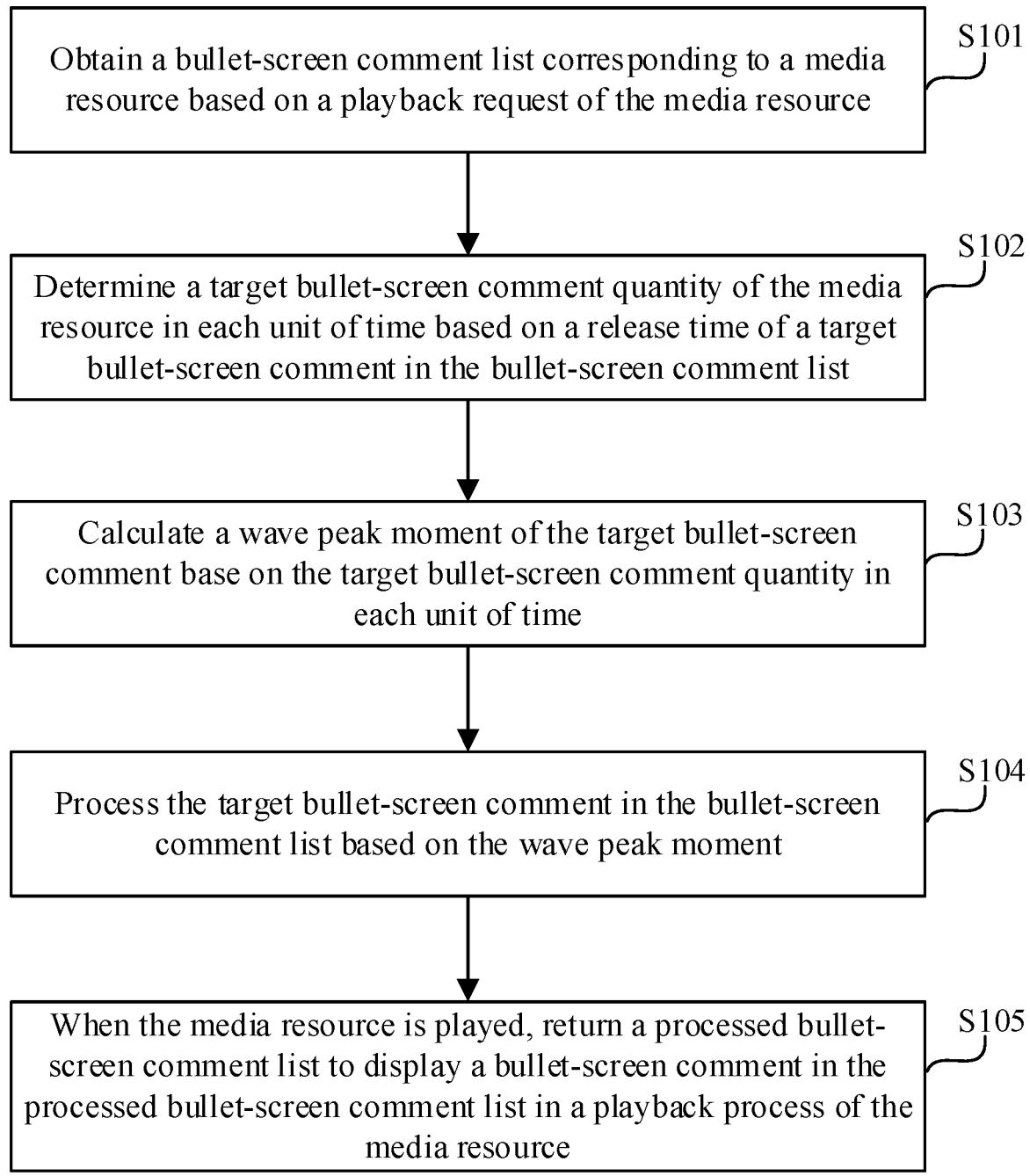
FIG. 1 is a schematic flowchart of a bullet-screen comment display method according to some embodiments of this application.

FIG. 1 is a schematic flowchart of a bullet-screen comment display method according to some embodiments of this application. As shown in FIG. 1, the method may include the following steps.

Step S101: Obtain a bullet-screen comment list corresponding to a media resource based on a playback request of the media resource.

Specifically, a user may watch the media resource by using a media application that is installed on the terminal device, and the media application provides a playback button. When any user wants to watch the media resource, the playback button in the media resource application may be triggered to implement playback of the media resource. Therefore, an operation of triggering the playback button by the user is considered as sending a playback request of the media resource, and a bullet-screen comment list corresponding to the media resource is obtained based on the playback request of the media resource, where the bullet-screen comment list is a set of all bullet-screen comments that have been released for the media resource before the current user plays the media resource, and a file recorded for the media resource in advance, for example, may be a video.

Step S102: Determine a target bullet-screen comment quantity of the media resource in each unit of time based on a release time of a target bullet-screen comment in the bullet-screen comment list.

The target bullet-screen comment is a specific bullet-screen comment that is released for the media resource. For example, the target bullet-screen comment may be an anomalous bullet-screen comment or a target text bullet-screen comment, where the anomalous bullet-screen comment is a non-pure text bullet-screen comment, for example, the anomalous bullet-screen comment is a picture bullet-screen comment, an expression bullet-screen comment, or a head portrait bullet-screen comment.

When any user watches a media resource, a target bullet-screen comment may be released based on an idea of watching the media resource. However, a case of target bullet-screen comment exploding is easy to occur. To avoid bullet-screen comment exploding, affecting watching experience of another user on the media resource, the target bullet-screen comment needs to be processed. Specifically, target bullet-screen comment may be processed by using steps S102 to S104.

Specifically, a release time of each bullet-screen comment is recorded in the bullet-screen comment list, where the release time is defined by duration of the media resource. For example, total duration of the media resource is 5 minutes, and the release time may be that the media resource is played to 1 minute, 1 minute and 15 seconds, or 2 minutes. This is not specifically limited herein. Therefore, the target bullet-screen comment quantity of the media resource in each unit of time may be determined based on the release time of the target bullet-screen comment in the bullet-screen comment list. For example, the release time of the target bullet-screen comment may be matched with each unit of time of the media resource, to group the target bullet-screen comment in the bullet-screen comment list, to obtain the target bullet-screen comment quantity in each unit of time, where each unit of time may use a second as a unit, and the target bullet-screen comment quantity in each unit of time is, in one unit time, a quantity of target bullet-screen comments that are released for the media resource.

Step S103: Calculate a wave peak moment of the target bullet-screen comment based on the target bullet-screen comment quantity in each unit of time.

Specifically, a calculation rule of the wave peak moment is as follows: A target bullet-screen comment quantity in a previous unit time is less than a target bullet-screen comment quantity in a current unit time, the target bullet-screen comment quantity in the current unit time is greater than a target bullet-screen comment quantity in a subsequent unit time, and the previous unit time, the current unit time, and the subsequent unit time are adjacent. Therefore, the foregoing calculation rule may be used to compare the target bullet-screen comment quantity in each unit of time, to obtain wave peak moments of all the target bullet-screen comments in the media resource through calculation.

Step S104: Process the target bullet-screen comment in the bullet-screen comment list based on the wave peak moment.

After the wave peak moment of the target bullet-screen comment is determined, the target bullet-screen comment in the bullet-screen comment list may be processed based on the wave peak moment.

For example, in some embodiments, the target bullet-screen comment at the wave peak moment may be displayed, and another target bullet-screen comment at a non-wave peak moment in the bullet-screen comment list is deleted. Alternatively, the target bullet-screen comment display time period and the target bullet-screen comment silence time period are determined based on the wave peak moment, and the target bullet-screen comment in the target bullet-screen comment silence time period is deleted. A processing manner is not specifically limited herein.

Step S105: When the media resource is played, return a processed bullet-screen comment list to display a bullet-screen comment in the processed bullet-screen comment list in a playback process of the media resource.

When the media resource is played, the processed bullet-screen comment list is returned, so that in the media resource playback process, a bullet-screen comment in the processed bullet-screen comment list is displayed in the media resource with reference to a release time of each bullet-screen comment in the processed bullet-screen comment list, so that a quantity and a time point of exposure of the target bullet-screen comment are effectively controlled, a problem of target bullet-screen comment exploding and contamination is resolved from the source, and watching experience of the bullet-screen comment is improved.

In the solution provided in this present invention, the wave peak moment of the target bullet-screen comment is calculated based on the target bullet-screen comment quantity, and the target bullet-screen comment in the bullet-screen comment list is processed based on the wave peak moment, so that a quantity and a time point of exposure of the target bullet-screen comment are effectively controlled, a problem of target bullet-screen comment exploding and contamination is resolved from the source, and watching experience of the bullet-screen comment is improved.

To better express the interest of the bullet-screen comment, so that the bullet-screen comment and the video content are better integrated, and display forms of the bullet-screen comment are increasingly diversified, for example, the user may release an anomalous bullet-screen comment. Currently, a common anomalous bullet-screen comment has a head portrait bullet-screen comment, an expression bullet-screen comment, and a picture bullet-screen comment.

However, in some cases, the watching experience of these anomalous bullet-screen comments has a negative impact on the watching experience of the video. For example, the user sends an anomalous bullet-screen comment at a time point with an inappropriate atmosphere. Alternatively, the user performs continuous anomalous bullet-screen comment exploding from the beginning to the end of the video. To resolve the foregoing problem, a common processing manner in the conventional technology is to improve a threshold for sending such a bullet-screen comment by the user, for example, improving such a user level limitation of sending the bullet-screen comment.

In a scenario in which an anomalous bullet-screen comment has a negative impact, the user often sends an anomalous bullet-screen comment out of curiosity and follow suit. Therefore, an attempt to improve a threshold for sending an anomalous bullet-screen comment by the user can only restrain, to a specific extent, an overflow of poor watching experience of an anomalous bullet-screen comment, which cannot be fundamentally resolved. In addition, a sending threshold is raised, and a user who cannot send an anomalous bullet-screen comment also has a great loss in experience. To better resolve the foregoing problem, in the embodiment in FIG. 2A, a bullet-screen comment display solution is described in detail by using an example in which a target bullet-screen comment is an anomalous bullet-screen comment, and a media resource is a video.

Figure 2A:
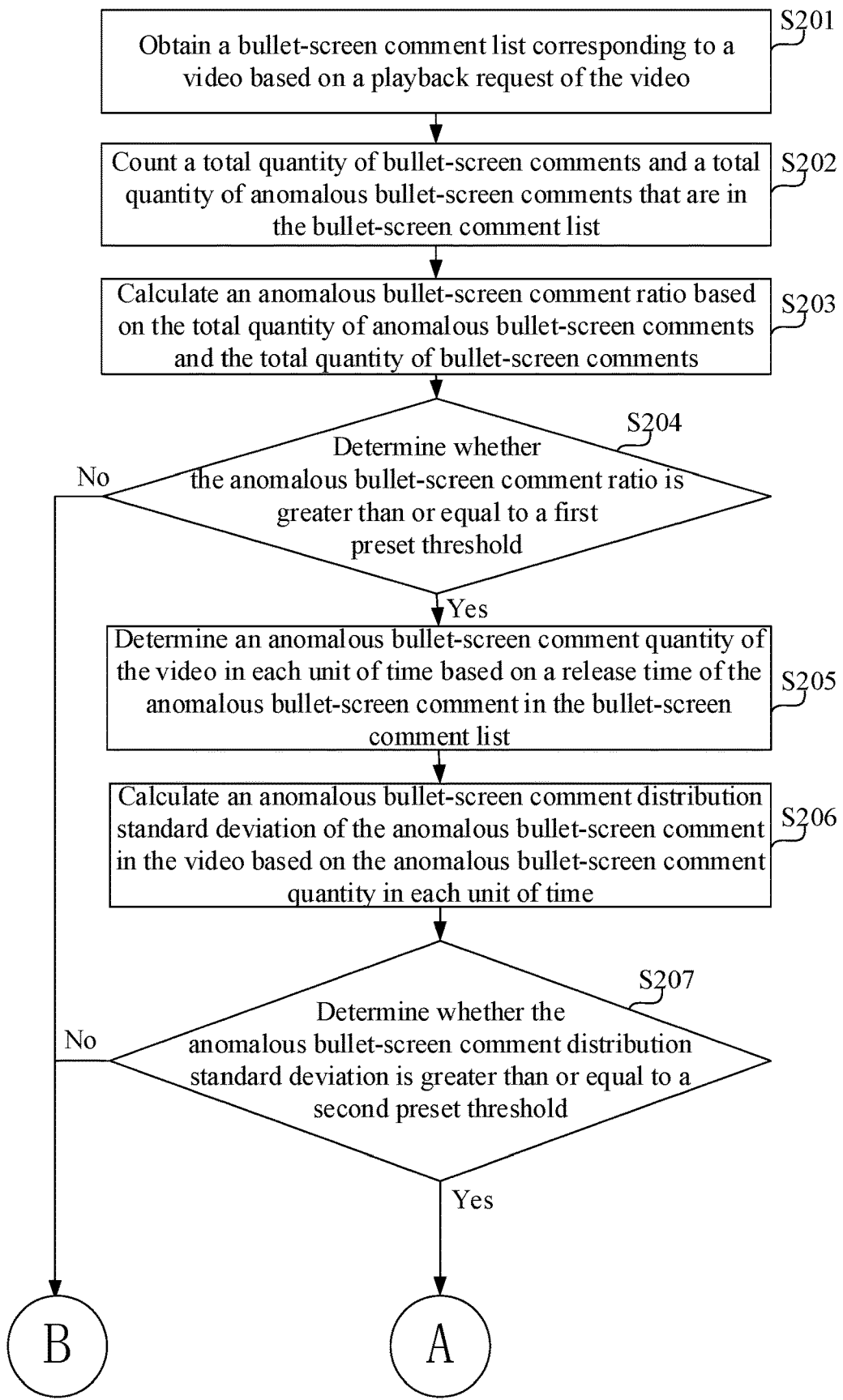
FIG. 2A is a schematic flowchart of a bullet-screen comment display method according to some embodiments of this application.
Figure 2A:
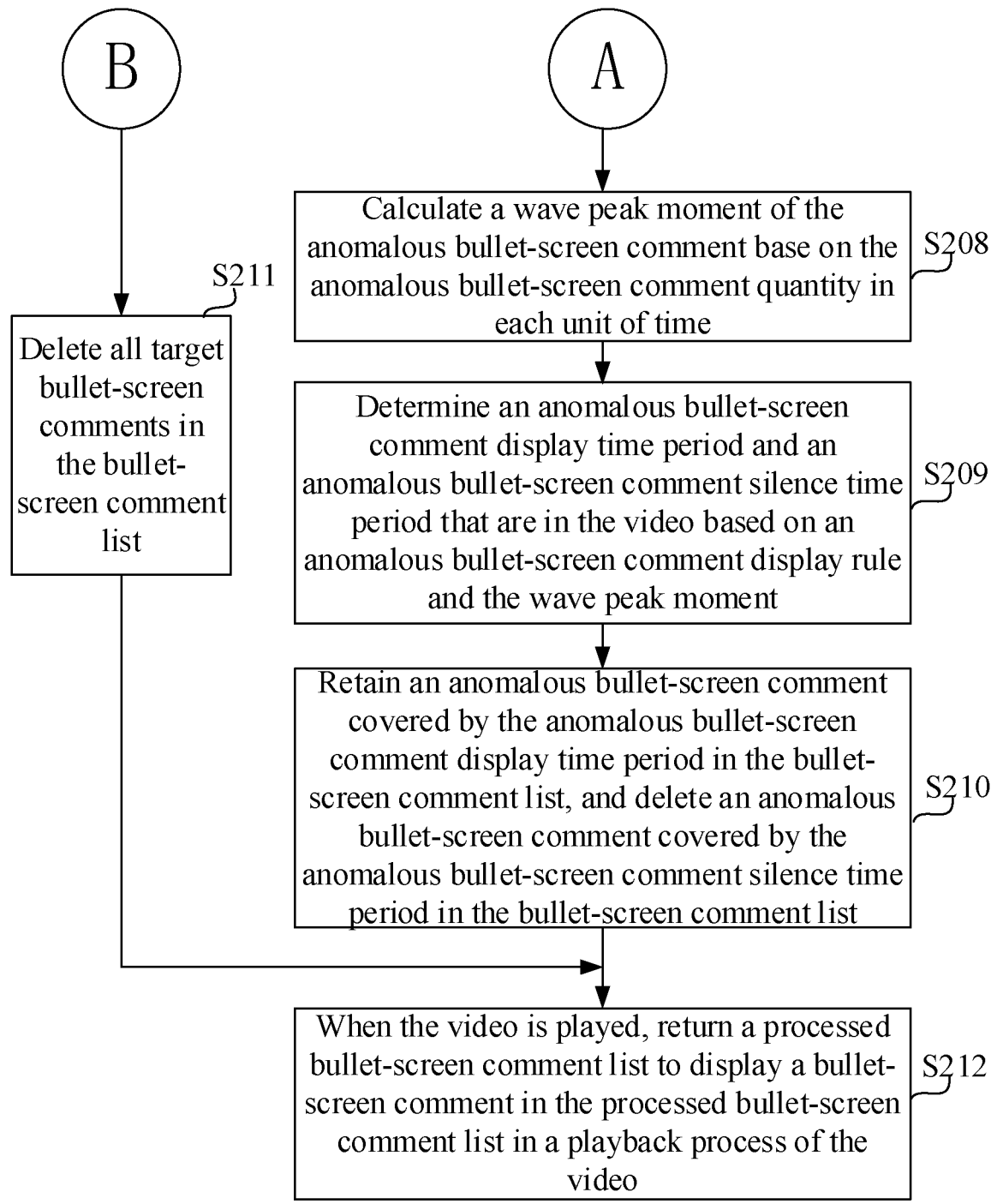

FIG. 2A is a schematic flowchart of a bullet-screen comment display method according to some embodiments of this application. As shown in FIG. 2A, the method may include the following steps.

Step S201: Obtain a bullet-screen comment list corresponding to a video based on a playback request of the video.

Specifically, a user may watch the video by using a video application that is installed on the terminal device, and the video application provides a playback button. When any user wants to watch the video, the playback button in the video application may be triggered to implement playback of the video. Therefore, an operation of triggering, by the user, the playback button is considered as sending a video playback request, and a bullet-screen comment list corresponding to the video is obtained based on the video playback request, where the bullet-screen comment list is a set of all bullet-screen comments that have been released for the video before the current user plays the video.

Step S202: Count a total quantity of bullet-screen comments and a total quantity of anomalous bullet-screen comments that are in the bullet-screen comment list.

After the bullet-screen comment list corresponding to the video is obtained, the total quantity of all bullet-screen comments and the total quantity of anomalous bullet-screen comments that are in the bullet-screen comment list are counted.

Step S203: Calculate an anomalous bullet-screen comment ratio based on the total quantity of anomalous bullet-screen comments and the total quantity of bullet-screen comments.

After the total quantity of bullet-screen comments and the total quantity of anomalous bullet-screen comments are counted, the anomalous bullet-screen comment ratio is calculated based on the total quantity of anomalous bullet-screen comments and the total quantity of bullet-screen comments. The anomalous bullet-screen comment ratio is a percentage of an anomalous bullet-screen comment in total bullet-screen comments. For example, the anomalous bullet-screen comment ratio may be specifically calculated in the following calculation manner: anomalous bullet-screen comment ratio=total quantity of anomalous bullet-screen comments/total quantity of bullet-screen comments.

Step S204: Determine whether the anomalous bullet-screen comment ratio is greater than or equal to a first preset threshold, and if yes, perform step 205; or if no, perform step S211.

Generally, when a video is played to its climax, a large quantity of users may have an idea of releasing an anomalous bullet-screen comment, and there are a large quantity of anomalous bullet-screen comments. However, if anomalous bullet-screen comments are exploding, the quantity of anomalous bullet-screen comments is not too large. Therefore, to identify whether there is anomalous bullet-screen comment exploding, after the anomalous bullet-screen comment ratio is obtained through calculation based on step S203, the anomalous bullet-screen comment ratio is compared with the first preset threshold, to determine whether the anomalous bullet-screen comment ratio is greater than or equal to the first preset threshold. The first preset threshold is a boundary value, and the value is used to measure whether there is a possibility of bullet-screen comment exploding for the anomalous bullet-screen comment. If the anomalous bullet-screen comment ratio is less than the first preset threshold, it indicates that the anomalous bullet-screen comments are exploding; or if the anomalous bullet-screen comment ratio is greater than or equal to the first preset threshold, it indicates that the anomalous bullet-screen comments may not be exploding, and the next step may be further performed.

Step S205: Determine an anomalous bullet-screen comment quantity of the video in each unit of time based on a release time of the anomalous bullet-screen comment in the bullet-screen comment list.

Specifically, a release time of each bullet-screen comment is recorded in the bullet-screen comment list, where the release time is defined by duration of the video. For example, the total duration of the video is 5 minutes, and the release time may be that the video is played to 1 minute, 1 minute and 15 seconds, or 2 minutes. This is not specifically limited herein. Therefore, the anomalous bullet-screen comment quantity in each unit of time of the video may be determined based on the release time of the anomalous bullet-screen comment in the bullet-screen comment list. For example, the release time of the anomalous bullet-screen comment may be matched with each unit of time of the video, to group the anomalous bullet-screen comment in the bullet-screen comment list, to obtain the anomalous bullet-screen comment quantity in each unit of time, where each unit of time may use a second as a unit, and the anomalous bullet-screen comment quantity in each unit of time is, in one unit time, a quantity of anomalous bullet-screen comments that are released for the video.

Step S206: Calculate an anomalous bullet-screen comment distribution standard deviation of the anomalous bullet-screen comment in the video based on the anomalous bullet-screen comment quantity in each unit of time.

After the anomalous bullet-screen comment quantity in each unit of time is obtained through calculation, the anomalous bullet-screen comment distribution standard deviation in the entire video may be calculated based on the anomalous bullet-screen comment quantity in each unit of time. The anomalous bullet-screen comment distribution standard deviation reflects the distribution status of the anomalous bullet-screen comments released for the video. A specific calculation process is not described in detail herein.

Step S207: Determine whether the anomalous bullet-screen comment distribution standard deviation is greater than or equal to a second preset threshold, and if yes, perform step 208; or if no, perform step S211.

The anomalous bullet-screen comment distribution standard deviation reflects the distribution status of the anomalous bullet-screen comment released for the video. To determine whether there is a possibility of bullet-screen comment exploding for the anomalous bullet-screen comment released for the video, the anomalous bullet-screen comment distribution standard deviation needs to be compared with the second preset threshold, to determine whether the anomalous bullet-screen comment distribution standard deviation is greater than or equal to the second preset threshold, and the second preset threshold is a boundary value, where the value is used to measure whether there is possibility of bullet-screen comment exploding for the anomalous bullet-screen comment. If the anomalous bullet-screen comment distribution standard deviation is less than the second preset threshold, it indicates that the anomalous bullet-screen comments are exploding. If the anomalous bullet-screen comment distribution standard deviation is greater than or equal to the second preset threshold, it indicates that the anomalous bullet-screen comments may not be exploding, and the next step may be further performed.

Step S208: Calculate a wave peak moment of the anomalous bullet-screen comment based on the anomalous bullet-screen comment quantity in each unit of time.

Specifically, a calculation rule of the wave peak moment is as follows: An anomalous bullet-screen comment quantity in a previous unit time is less than an anomalous bullet-screen comment quantity in a current unit time, the anomalous bullet-screen comment quantity in the current unit time is greater than an anomalous bullet-screen comment quantity in a subsequent unit time, and the previous unit time, the current unit time, and the subsequent unit time are adjacent. Therefore, the foregoing calculation rule may be used to compare the anomalous bullet-screen comment quantity in each unit of time, to obtain wave peak moments of all anomalous bullet-screen comments in the video through calculation.

Step S209: Determine an anomalous bullet-screen comment display time period and an anomalous bullet-screen comment silence time period that are in the video based on an anomalous bullet-screen comment display rule and the wave peak moment.

The anomalous bullet-screen comment display rule defines how the anomalous bullet-screen comment display is performed. The anomalous bullet-screen comment display rule includes: anomalous bullet-screen comment display duration and anomalous bullet-screen comment silence duration. The anomalous bullet-screen comment display duration defines duration displayed by the anomalous bullet-screen comment each time. The anomalous bullet-screen comment silence duration defines how long it takes to display the anomalous bullet-screen comment again after displaying the anomalous bullet-screen comment each time.

Specifically, when determining the anomalous bullet-screen comment display time period and the anomalous bullet-screen comment silence time period in the video, the anomalous bullet-screen comment display time period and the anomalous bullet-screen comment silence time period are determined based on an anomalous bullet-screen comment display rule and the wave peak moment, and with reference to the wave peak moment herein, it can be ensured that the wave peak moment of the anomalous bullet-screen comment may be displayed in some embodiments.

Figure 2B:
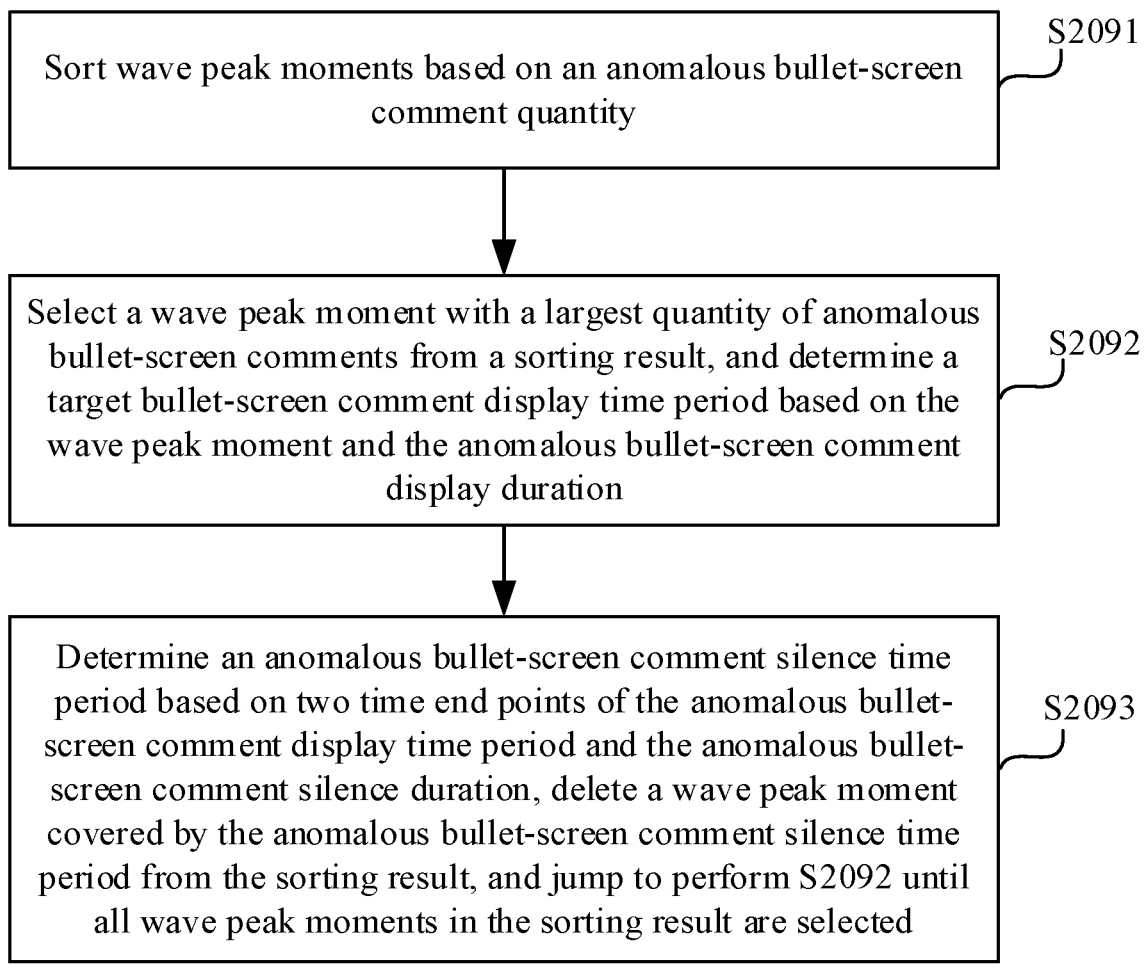
FIG. 2B is a schematic diagram of a specific implementation method in step S209.

In some embodiments of the present invention, FIG. 2B is a schematic diagram of a specific implementation method in step S209. As shown in FIG. 2B, this step may be specifically implemented by using the following method:

S2091: Sort wave peak moments based on an anomalous bullet-screen comment quantity.

S2092: Select a wave peak moment with a largest quantity of anomalous bullet-screen comments from a sorting result, and determine an anomalous bullet-screen comment display time period based on the wave peak moment and the anomalous bullet-screen comment display duration.

S2093: Determine an anomalous bullet-screen comment silence time period based on two time end points of the anomalous bullet-screen comment display time period and the anomalous bullet-screen comment silence duration, delete a wave peak moment covered by the anomalous bullet-screen comment silence time period from the sorting result, and jump to perform S2092 until all wave peak moments in the sorting result are selected.

Specifically, each wave peak moment corresponds to an anomalous bullet-screen comment quantity. Therefore, the wave peak moments may be sorted based on the anomalous bullet-screen comment quantity. For example, the wave peak moments are sorted based on anomalous bullet-screen comment quantities in descending order or in ascending order. Sorting here is to ensure that an anomalous bullet-screen comment in a time period corresponding to a wave peak moment with a large quantity of anomalous bullet-screen comments may be displayed in some embodiments.

Figure 2C:
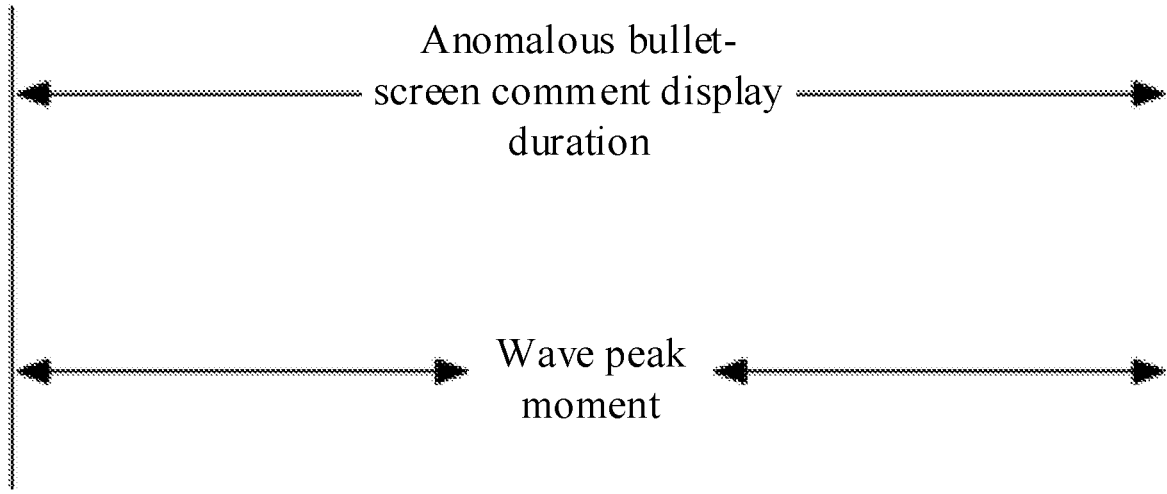
FIG. 2C is a schematic diagram of a process of determining a display time period of an anomalous bullet-screen comment.

An unselected wave peak moment with a largest quantity of anomalous bullet-screen comments is selected from the sorting result, and an anomalous bullet-screen comment display time period is determined based on the wave peak moment and the anomalous bullet-screen comment display duration. For example, the wave peak moment that is used as a middle moment of the anomalous bullet-screen comment display time period and the anomalous bullet-screen comment display duration are superimposed, to obtain the anomalous bullet-screen comment display time period, as shown in FIG. 2C. For example, the wave peak moment is a 10th second of the video, and the anomalous bullet-screen comment display duration is 5 seconds. In this case, the 10th second is used as a middle point to superimpose the anomalous bullet-screen comment duration, so that it is determined that the anomalous bullet-screen comment display time period is a time period from an 8th second to a 12th second of the video. After the anomalous bullet-screen comment display time period is determined, the anomalous bullet-screen comment silence time period is determined based on the determined two time end points of the anomalous bullet-screen comment display time period and the anomalous bullet-screen comment silence duration. For example, an anomalous bullet-screen comment silence time period is obtained by superimposing the anomalous bullet-screen comment silence time period on a next unit time (for example, second) of the two time end points. For example, the anomalous bullet-screen comment silence time period is 3 seconds, and the anomalous bullet-screen comment display time period is the 8th second to 12th second. Therefore, the 5th second to the 7th second and the 13th second to the 15th second are anomalous bullet-screen comment silence time periods.

After the anomalous bullet-screen comment silence time period is determined, the wave peak moment covered by the anomalous bullet-screen comment silence time period is deleted from the sorting result. For example, if it is determined that the anomalous bullet-screen comment silence time period is the 13th second to the 15th second, and the 13th second is the wave peak moment, the wave peak moment of the 13th second needs to be deleted from the sorting result of the wave peak moment, and jump to perform S2092 until all wave peak moments in the sorting result are selected. This is merely an example, and does not impose any limitation. Another wave peak moment covered by the anomalous bullet-screen comment display time period is also not selected, and the wave peak moment covered by the anomalous bullet-screen comment display time period is deleted from the sorting result.

In some embodiments of the present invention, before the sorting wave peak moments based on an anomalous bullet-screen comment quantity, the method further includes: determining whether a target bullet-screen comment quantity at the wave peak moment is greater than or equal to a third preset threshold; if the target bullet-screen comment quantity at the wave peak moment is greater than or equal to the third preset threshold, retaining the wave peak moment; or if the target bullet-screen comment quantity at the wave peak moment is less than the third preset threshold, deleting the wave peak moment.

Specifically, when the video is long, there may be a plurality of wave peaks. If no screening is performed, an anomalous bullet-screen comment may be frequently displayed, which affects watching experience of the user. Therefore, a wave peak threshold, that is, the third preset threshold, is set to select the wave peak moment. When the anomalous bullet-screen comment quantity at the wave peak moment is greater than or equal to the third preset threshold, the wave peak moment is retained. When the anomalous bullet-screen comment quantity at the wave peak moment is less than the third preset threshold, the wave peak moment is deleted.

Step S210: Retain an anomalous bullet-screen comment covered by the anomalous bullet-screen comment display time period in the bullet-screen comment list, and delete an anomalous bullet-screen comment covered by the anomalous bullet-screen comment silence time period in the bullet-screen comment list.

After the anomalous bullet-screen comment display time period and the anomalous bullet-screen comment silence time period are determined, the anomalous bullet-screen comment in the bullet-screen comment list may be processed based on the anomalous bullet-screen comment display time period and the anomalous bullet-screen comment silence time period. For example, the anomalous bullet-screen comment covered by the anomalous bullet-screen comment display time period in the bullet-screen comment list is retained, and the anomalous bullet-screen comment covered by the anomalous bullet-screen comment silence time period in the bullet-screen comment list is deleted, thereby controlling the anomalous bullet-screen comment display time period and the anomalous bullet-screen comment display quantity, and then jumping to perform step S212.

In some embodiments of the present invention, the anomalous bullet-screen comment display rule includes: a preset anomalous bullet-screen comment display quantity, that is, a largest quantity of anomalous bullet-screen comments displayed in the anomalous bullet-screen comment display time period is specified.

Therefore, the retaining an anomalous bullet-screen comment covered by the anomalous bullet-screen comment display time period in the bullet-screen comment list may be implemented by using the following method: determining whether an anomalous bullet-screen comment quantity in the anomalous bullet-screen comment display period is greater than the preset anomalous bullet-screen comment display quantity;

if the anomalous bullet-screen comment quantity in the anomalous bullet-screen comment display time period is greater than the preset anomalous bullet-screen comment display quantity, retaining an anomalous bullet-screen comment that is of the preset anomalous bullet-screen comment display quantity and that is covered by the anomalous bullet-screen comment display time period in the bullet-screen comment list; or if the anomalous bullet-screen comment quantity in the anomalous bullet-screen comment display time period is not greater than the preset anomalous bullet-screen comment display quantity, retaining the anomalous bullet-screen comment covered by the anomalous bullet-screen comment display time period in the bullet-screen comment list.

Specifically, the anomalous bullet-screen comment quantity in the anomalous bullet-screen comment display time period is compared with the preset anomalous bullet-screen comment display quantity. If the anomalous bullet-screen comment quantity in the anomalous bullet-screen comment display time period is greater than the preset anomalous bullet-screen comment display quantity, it is determined that the anomalous bullet-screen comment quantity in the anomalous bullet-screen comment display time period exceeds a largest quantity of anomalous bullet-screen comment that can be displayed in the time period, an exceeded anomalous bullet-screen comment needs to be deleted, and a preset quantity of anomalous bullet-screen comment display needs to be retained. When the anomalous bullet-screen comment is deleted, the exceeded anomalous bullet-screen comment may be randomly deleted, or an anomalous bullet-screen comment with an earlier release time may be deleted. If there are a plurality of types of anomalous bullet-screen comments in the anomalous bullet-screen comment display time period, each type of anomalous bullet-screen comments may be kept evenly, and redundant anomalous bullet-screen comments may be deleted. If the anomalous bullet-screen comment quantity in the anomalous bullet-screen comment display time period is less than or equal to the preset anomalous bullet-screen comment display quantity, the anomalous bullet-screen comment covered by the anomalous bullet-screen comment display time period in the bullet-screen comment list is retained, and the anomalous bullet-screen comment in the time period is not deleted.

Step S211: Delete all target bullet-screen comments in the bullet-screen comment list.

If the anomalous bullet-screen comment ratio is less than the first preset threshold, or if the anomalous bullet-screen comment distribution standard deviation is less than the second preset threshold, all the target bullet-screen comments in the bullet-screen comment list are deleted, and jump to perform step S212.

Step S212: When the video is played, return a processed bullet-screen comment list to display a bullet-screen comment in the processed bullet-screen comment list in a playback process of the video.

When the video is played, the processed bullet-screen comment list is returned, so that in the video playback process, a bullet-screen comment in the processed bullet-screen comment list is displayed in the video with reference to a release time of each bullet-screen comment in the processed bullet-screen comment list, so that a quantity and a time point of exposure of the target bullet-screen comment are effectively controlled, a problem of target bullet-screen comment exploding and contamination is resolved from the source, and watching experience of the bullet-screen comment is improved.

In the solution provided in this present invention, the wave peak moment of the anomalous bullet-screen comment is calculated based on the anomalous bullet-screen comment quantity; the anomalous bullet-screen comment display time period and the anomalous bullet-screen comment silent time period that are in the video are determined based on the anomalous bullet-screen comment display rule and the wave peak moment; the anomalous bullet-screen comment covered by the anomalous bullet-screen comment in the bullet-screen comment list is retained, and the anomalous bullet-screen comment covered by the silent time period of an anomalous bullet-screen comment in the bullet-screen comment list is deleted, so that a quantity and a time point of exposure of the anomalous bullet-screen comment exploding and contamination of the anomalous bullet-screen comment are effectively controlled, and a problem of the anomalous bullet-screen comment exploding and contamination is resolved from the source, watching experience of the bullet-screen comment is improved, and the anomalous bullet-screen comment is enabled to be better integrated with video content.

Figure 3:
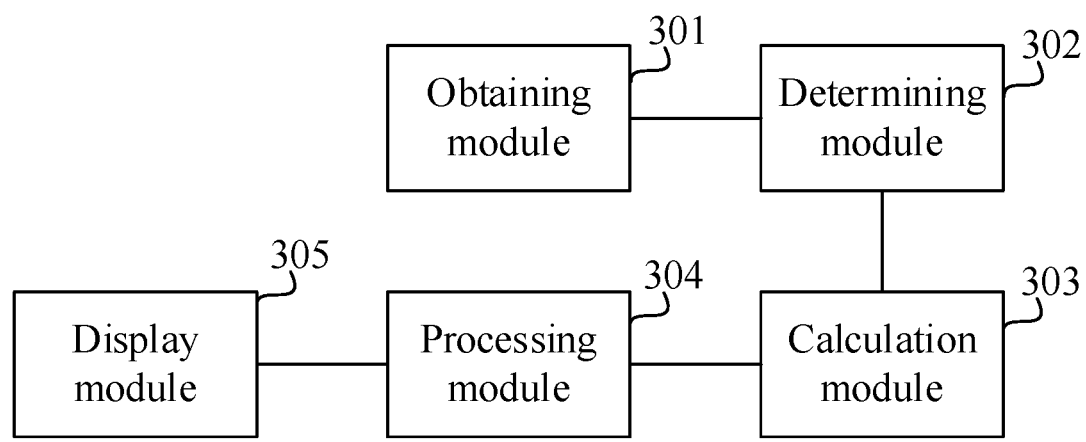
FIG. 3 is a schematic diagram of a structure of a bullet-screen comment display apparatus according to some embodiments of this application.

FIG. 3 is a schematic diagram of a structure of a bullet-screen comment display apparatus according to some embodiments of this application. As shown in FIG. 3, the apparatus includes an obtaining module 301, a determining module 302, a calculation module 303, a processing module 304, and a display module 305.

The obtaining module 301 is adapted to obtain a bullet-screen comment list corresponding to a media resource based on a playback request of the media resource.

The determining module 302 is adapted to determine a target bullet-screen comment quantity of the media resource in each unit of time based on a release time of a target bullet-screen comment in the bullet-screen comment list.

The first calculation module 303 is adapted to calculate a wave peak moment of the target bullet-screen comment based on the target bullet-screen comment quantity in each unit of time.

The first processing module 304 is adapted to process the target bullet-screen comment in the bullet-screen comment list based on the wave peak moment.

The display module 305 is adapted to: when the media resource is played, return a processed bullet-screen comment list to display a bullet-screen comment in the processed bullet-screen comment list in a playback process of the media resource.

In some embodiments, the first processing module is further adapted to: determine a target bullet-screen comment display time period and a target bullet-screen comment silence time period that are in the media resource based on a target bullet-screen comment display rule and the wave peak moment; and retain a target bullet-screen comment covered by the target bullet-screen comment display time period in the bullet-screen comment list, and delete a target bullet-screen comment covered by the target bullet-screen comment silence time period in the bullet-screen comment list.

In some embodiments, the target bullet-screen comment display rule includes: target bullet-screen comment display duration and target bullet-screen comment silence duration.

In some embodiments, the first processing module is further adapted to: S1: Sort wave peak moments based on a target bullet-screen comment quantity.

S2: Select a wave peak moment with a largest quantity of target bullet-screen comments from a sorting result, and determine a target bullet-screen comment display time period based on the wave peak moment and the target bullet-screen comment display duration.

S3: Determine a target bullet-screen comment silence time period based on two time end points of the target bullet-screen comment display time period and the target bullet-screen comment silence duration, delete a wave peak moment covered by the target bullet-screen comment silence time period from the sorting result, and jump to perform S2 until all wave peak moments in the sorting result are selected.

In some embodiments, the first processing module is further adapted to: superimpose the wave peak moment that is used as a middle moment of the target bullet-screen comment display time period and the target bullet-screen comment display duration, to obtain the target bullet-screen comment display time period.

In some embodiments, the target bullet-screen comment display rule includes a preset target bullet-screen comment display quantity.

The first processing module is further adapted to: determine whether a target bullet-screen comment quantity in the target bullet-screen comment display time period is greater than the preset target bullet-screen comment display quantity; and if the target bullet-screen comment quantity in the target bullet-screen comment display time period is greater than the preset target bullet-screen comment display quantity, retain a target bullet-screen comment that is of the preset target bullet-screen comment display quantity and that is covered by the target bullet-screen comment display time period in the bullet-screen comment list; or if the target bullet-screen comment quantity in the target bullet-screen comment display time period is not greater than the preset target bullet-screen comment display quantity, retain a target bullet-screen comment covered by the target bullet-screen comment display time period in the bullet-screen comment list.

In some embodiments, the apparatus further includes: a first determining module, adapted to determine whether a target bullet-screen comment quantity at the wave peak moment is greater than or equal to a third preset threshold; and a second processing module, adapted to: if the target bullet-screen comment quantity at the wave peak moment is greater than or equal to the third preset threshold, retain the wave peak moment; or if the target bullet-screen comment quantity at the wave peak moment is less than the third preset threshold, delete the wave peak moment.

In some embodiments, the apparatus further includes: a counting module, adapted to count a total quantity of bullet-screen comments and a total quantity of target bullet-screen comments that are in the bullet-screen comment list;
  a second calculation module, adapted to calculate a target bullet-screen comment ratio based on the total quantity of target bullet-screen comments and the total quantity of bullet-screen comments;
  a determining module is further adapted to: if the target bullet-screen comment ratio is greater than or equal to a first preset threshold, determine the target bullet-screen comment quantity of the media resource in each unit of time based on the release time of the target bullet-screen comment in the bullet-screen comment list; and
  a deletion module, adapted to: if the target bullet-screen comment ratio is less than a first preset threshold, delete all target bullet-screen comments in the bullet-screen comment list.

In some embodiments, the apparatus further includes: a third calculation module, adapted to calculate a target bullet-screen comment distribution standard deviation of the target bullet-screen comment in the media resource based on the target bullet-screen comment quantity in each unit of time; and
  the determining module is further adapted to: if the target bullet-screen comment distribution standard deviation is greater than or equal to a second preset threshold, calculate a wave peak moment of the target bullet-screen comment based on the target bullet-screen comment quantity in each unit of time; and
  a deletion module, adapted to: if the target bullet-screen comment ratio is less than a second preset threshold, delete all target bullet-screen comments in the bullet-screen comment list.

In some embodiments, the target bullet-screen comment includes an anomalous bullet-screen comment and/or a target text bullet-screen comment.

In the solution provided in this present invention, the wave peak moment of the target bullet-screen comment is calculated based on the target bullet-screen comment quantity, and the target bullet-screen comment in the bullet-screen comment list is processed based on the wave peak moment, so that a quantity and a time point of exposure of the target bullet-screen comment are effectively controlled, a problem of target bullet-screen comment exploding and contamination is resolved from the source, and watching experience of the bullet-screen comment is improved.

Some embodiments of this application further provide a non-volatile computer storage medium, where the computer storage medium stores at least one executable instruction, and the computer executable instruction may perform the bullet-screen comment display method in any one of the foregoing method embodiments.

Figure 4:
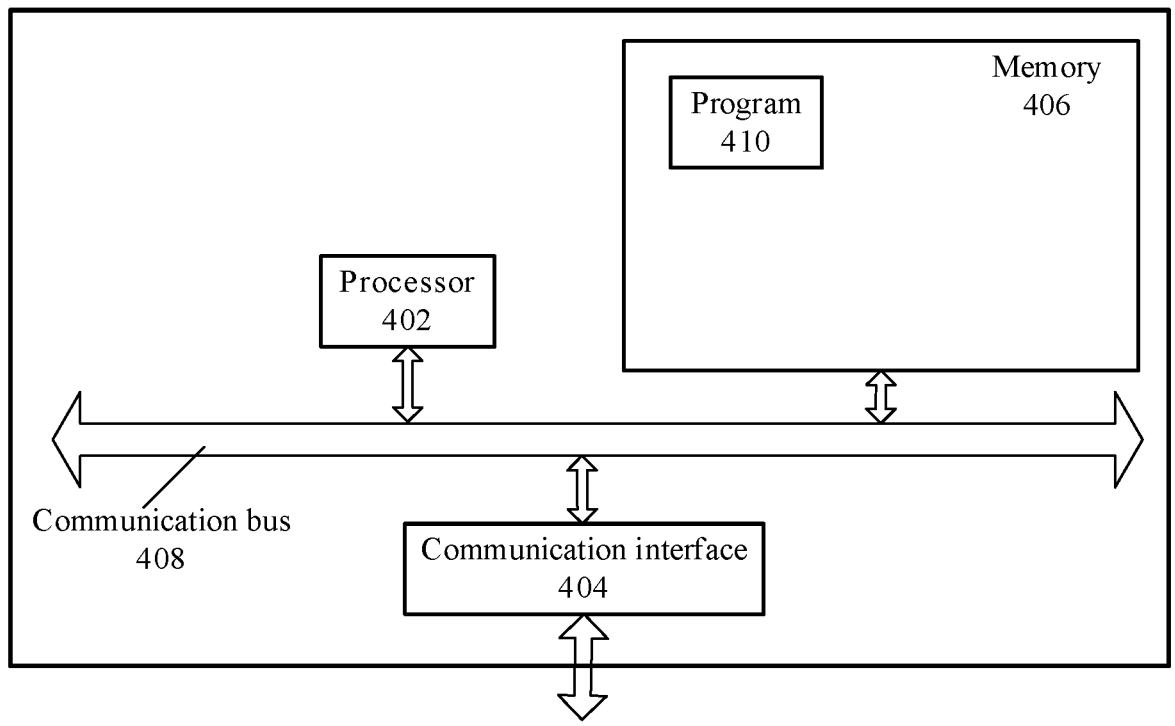
FIG. 4 is a schematic diagram of a structure of a computing device according to some embodiments of this application.

FIG. 4 is a schematic diagram of a structure of a computing device according to some embodiments of this application. Specific implementation of the computing device is not limited in specific embodiments of this application.

As shown in FIG. 4, the computing device may include a processor 402, a communication interface 404, a memory 406, and a communication bus 408.

The processor 402, the communication interface 404, and the memory 406 complete mutual communication by using the communication bus 408.

The communication interface 404 is configured to communicate with a network element of another device such as a client or another server.

The processor 402 is configured to execute a program 410, and may specifically perform related steps in the foregoing bullet-screen comment display method embodiments.

Specifically, the program 410 may include program code, and the program code includes computer operation instructions.

The processor 402 may be a central processing unit (CPU), an application specific integrated circuit (ASIC), or one or more integrated circuits configured to implement embodiments of this application. One or more processors included in the computing device may be processors with a same type, for example, one or more CPUs, may also be processors with different types, such as one or more CPUs and one or more ASICs.

The memory 406 is configured to store the program 410. The memory 406 may include a high-speed RAM memory, and may further include a non-volatile memory, for example, at least one disk memory.

The program 410 may be specifically configured to enable the processor 402 to perform the bullet-screen comment display method in any one of the foregoing method embodiments. For specific implementation of steps in the program 410, refer to corresponding descriptions in steps and units in the foregoing bullet-screen comment display embodiments, and details are not described herein again. It may be clearly understood by a person skilled in the art that, for convenience and brevity of the description, for a detailed working process of the foregoing device and module, refer to corresponding process descriptions in the foregoing method embodiments, and details are not described herein again.

The algorithms or displays provided herein are not inherently related to any particular computer, virtual system, or another device. Various common systems may also be used with demonstrations here. According to the foregoing descriptions, the required structure to construct such a system is obvious. In addition, embodiments of this application are not specific to any specific programming language. It should be understood that the content of this application described herein may be implemented by using various programming languages, and the foregoing description of a specific language is intended to disclose a best implementation of this application.

The specification provided herein describes a large quantity of specific details. However, it can be understood that embodiments of this application may be practiced without these specific details. In some instances, well-known methods, structures, and techniques are not shown in detail not to obscure the understanding of this specification.

Similarly, it should be understood that, to simplify this application and help understand one or more of the aspects of the present invention, in the foregoing description of the example embodiments of this application, features of embodiments of this application are sometimes grouped together into individual embodiments, diagram, or description thereof. However, the disclosed method should not be construed as reflecting the following intention: The application that requires protection requires more features than those expressly recorded in each claim. More specifically, as reflected in the following claims, aspects of the invention lie in less than all the features of the previously disclosed individual embodiments. Therefore, claims that follow a specific implementation are expressly incorporated herein by reference, and each claim is used as separate embodiments of this application.

A person skilled in the art may understand that modules in a device in some embodiments may be adaptively changed and disposed in one or more devices that are different from the embodiments. Modules, units, or components in embodiments may be combined into one module, unit, or component, and in addition, may be divided into a plurality of submodules, subunits, or subcomponents. In addition to such features and/or processes or at least some of the units are mutually exclusive, any combination may be used to combine all the features disclosed in this specification, including accompanying claims, abstracts, and drawings, as well as all the processes or units of any disclosed method or device. Unless otherwise expressly stated, each feature disclosed in this specification (including accompanying claims, abstracts, and drawings) may be replaced by an alternative feature providing the same, equivalent, or similar objective.

In addition, a person skilled in the art can understand that, although some embodiments herein include some features included in other embodiments rather than another feature, combinations of features of different embodiments mean that the features fall within the scope of this application and form different embodiments. For example, in the following claims, any one of the embodiments that require protection may be used in any combination manner.

The embodiments of components in this application may be implemented by using hardware, or may be implemented by using a software module running on one or more processors, or a combination thereof. A person skilled in the art should understand that in practice, a microprocessor or a digital signal processor (DSP) may be used to implement some or all functions of some or all components according to embodiments of this application. This application may further be implemented as a part or all of a device or apparatus program (for example, a computer program and a computer program product) used to perform the method described herein. Such a program for implementing this application may be stored in a computer readable medium, or may have a form of one or more signals. Such signals may be downloaded from the Internet site, provided on carrier signals, or provided in any other form.

It should be noted that the foregoing embodiments describe this application rather than limiting this application, and a person skilled in the art may design alternative embodiments without departing from the scope of alternative claims. In the claims, any reference symbols between brackets should not be constructed to limit the claims. The word "include" does not preclude the existence of elements or steps not listed in the claims. The word "a/an" or "one" before the element does not preclude the existence of a plurality of such elements. This application may be implemented by using hardware including several different elements and by using appropriately programmed computers. In the claims of enumerating units of several apparatuses, several units of these apparatuses may be specifically embodied by using a same hardware item. Use of the words first, second, and third does not indicate any order. These words can be interpreted as names. The steps in the foregoing embodiments should not be construed as a limitation on an execution sequence except for special description.

What is claimed is:

1. A method, comprising:
    obtaining a bullet-screen comment list corresponding to a media resource based on a playback request of the media resource;
    determining a target bullet-screen comment quantity of the media resource in each unit of time based on a release time of a target bullet-screen comment in the bullet-screen comment list;
    calculating a wave peak moment of the target bullet-screen comment based on the target bullet-screen comment quantity in each unit of time;
    processing the target bullet-screen comment in the bullet-screen comment list based on the wave peak moment, comprising:
    determining a target bullet-screen comment display time period and a target bullet-screen comment silence time period that are in the media resource based on a target bullet-screen comment display rule and the wave peak moment; and
    retaining a target bullet-screen comment covered by the target bullet-screen comment display time period in the bullet-screen comment list, and deleting a target bullet-screen comment covered by the target bullet-screen comment silence time period in the bullet-screen comment list; and
    in response to determining that the media resource is played, returning a processed bullet-screen comment list to display a bullet-screen comment in the processed bullet-screen comment list in a playback process of the media resource.

2. The method according to claim 1, wherein the target bullet-screen comment display rule comprises target bullet-screen comment display duration and target bullet-screen comment silence duration.

3. The method according to claim 2, wherein the determining the target bullet-screen comment display time period and the target bullet-screen comment silence time period that are in the media resource based on the target bullet-screen comment display rule and the wave peak moment further comprises:

sorting wave peak moments based on the target bullet-screen comment quantity;

performing following operations iteratively based on a sorting result of the wave peak moments, until all wave peak moments in the sorting result are selected:

selecting a wave peak moment with a largest quantity of target bullet-screen comments from the sorting result, and determining a target bullet-screen comment display time period based on the wave peak moment and the target bullet-screen comment display duration;

determining a target bullet-screen comment silence time period based on two time end points of the target bullet-screen comment display time period and the target bullet-screen comment silence duration, and deleting a wave peak moment covered by the target bullet-screen comment silence time period from the sorting result.

4. The method according to claim 3, wherein the determining the target bullet-screen comment display time period based on the wave peak moment and the target bullet-screen comment display duration further comprises:

superimposing the wave peak moment that is used as a middle moment of the target bullet-screen comment display time period and the target bullet-screen comment display duration, to obtain the target bullet-screen comment display time period.

5. The method according to claim 1, wherein the target bullet-screen comment display rule comprises: a preset target bullet-screen comment display quantity; and the retaining the target bullet-screen comment covered by the target bullet-screen comment display time period in the bullet-screen comment list further comprises:

determining whether a target bullet-screen comment quantity in the target bullet-screen comment display time period is greater than the preset target bullet-screen comment display quantity;

in response to determining that the target bullet-screen comment quantity in the target bullet-screen comment display time period is greater than the preset target bullet-screen comment display quantity, retaining a target bullet-screen comment that is of the preset target bullet-screen comment display quantity and that is covered by the target bullet-screen comment display time period in the bullet-screen comment list; and in response to determining that the target bullet-screen comment quantity in the target bullet-screen comment display time period is not greater than the preset target bullet-screen comment display quantity, retaining a target bullet-screen comment covered by the target bullet-screen comment display time period in the bullet-screen comment list.

6. The method according to claim 1, wherein before the processing the target bullet-screen comment in the bullet-screen comment list based on the wave peak moment, the method further comprises:

determining whether a target bullet-screen comment quantity at the wave peak moment is greater than or equal to a third preset threshold;

in response to determining that the target bullet-screen comment quantity at the wave peak moment is greater than or equal to the third preset threshold, retaining the wave peak moment; and in response to determining that the target bullet-screen comment quantity at the wave peak moment is less than the third preset threshold, deleting the wave peak moment.

7. The method according to claim 1, wherein before the determining a target bullet-screen comment quantity of the media resource in each unit of time based on the release time of the target bullet-screen comment in the bullet-screen comment list, the method further comprises:

counting a total quantity of bullet-screen comments and a total quantity of target bullet-screen comments that are in the bullet-screen comment list;

calculating a target bullet-screen comment ratio based on the total quantity of target bullet-screen comments and the total quantity of bullet-screen comments;

in response to determining that the target bullet-screen comment ratio is greater than or equal to a first preset threshold, determining the target bullet-screen comment quantity of the media resource in each unit of time based on the release time of the target bullet-screen comment in the bullet-screen comment list; and in response to determining that the target bullet-screen comment ratio is less than a first preset threshold, deleting all target bullet-screen comments in the bullet-screen comment list.

8. The method according to claim 1, wherein before the calculating a wave peak moment of the target bullet-screen comment based on the target bullet-screen comment quantity in each unit of time, the method further comprises:

calculating a target bullet-screen comment distribution standard deviation of the target bullet-screen comment in the media resource based on the target bullet-screen comment quantity in each unit of time;

in response to determining that the target bullet-screen comment distribution standard deviation is greater than or equal to a second preset threshold, calculating a wave peak moment of the target bullet-screen comment based on the target bullet-screen comment quantity in each unit of time; and in response to determining that the target bullet-screen comment ratio is less than a second preset threshold, deleting all target bullet-screen comments in the bullet-screen comment list.

9. The method according to claim 1, wherein the target bullet-screen comment comprises at least one of an anomalous bullet-screen comment and a target text bullet-screen comment.

10. A computing device, comprising:

one or more processors; and a memory, storing one or more programs configured to be executed by the one or more processors, the one or more programs comprising instructions for:

obtaining a bullet-screen comment list corresponding to a media resource based on a playback request of the media resource;

determining a target bullet-screen comment quantity of the media resource in each unit of time based on a release time of a target bullet-screen comment in the bullet-screen comment list;

calculating a wave peak moment of the target bullet-screen comment based on the target bullet-screen comment quantity in each unit of time;

processing the target bullet-screen comment in the bullet-screen comment list based on the wave peak moment, comprising:

determining a target bullet-screen comment display time period and a target bullet-screen comment silence time period that are in the media resource based on a target bullet-screen comment display rule and the wave peak moment; and retaining a target bullet-screen comment covered by the target bullet-screen comment display time period in the bullet-screen comment list, and deleting a target bullet-screen comment covered by the target bullet-screen comment silence time period in the bullet-screen comment list; and in response to determining that the media resource is played, returning a processed bullet-screen comment list to display a bullet-screen comment in the processed bullet-screen comment list in a playback process of the media resource.

11. The computing device according to claim 10, wherein the target bullet-screen comment display rule comprises target bullet-screen comment display duration and target bullet-screen comment silence duration.

12. The computing device according to claim 11, wherein the determining the target bullet-screen comment display time period and the target bullet-screen comment silence time period that are in the media resource based on the target bullet-screen comment display rule and the wave peak moment further comprises:

sorting wave peak moments based on the target bullet-screen comment quantity;

performing following operations iteratively based on a sorting result of the wave peak moments, until all wave peak moments in the sorting result are selected:

selecting a wave peak moment with a largest quantity of target bullet-screen comments from the sorting result, and determining a target bullet-screen comment display time period based on the wave peak moment and the target bullet-screen comment display duration;

determining a target bullet-screen comment silence time period based on two time end points of the target bullet-screen comment display time period and the target bullet-screen comment silence duration, and deleting a wave peak moment covered by the target bullet-screen comment silence time period from the sorting result.

13. The computing device according to claim 12, wherein the determining the target bullet-screen comment display time period based on the wave peak moment and the target bullet-screen comment display duration further comprises:

superimposing the wave peak moment that is used as a middle moment of the target bullet-screen comment display time period and the target bullet-screen comment display duration, to obtain the target bullet-screen comment display time period.

14. The computing device according to claim 10, wherein the target bullet-screen comment display rule comprises: a preset target bullet-screen comment display quantity; and the retaining the target bullet-screen comment covered by the target bullet-screen comment display time period in the bullet-screen comment list further comprises:

determining whether a target bullet-screen comment quantity in the target bullet-screen comment display time period is greater than the preset target bullet-screen comment display quantity;

in response to determining that the target bullet-screen comment quantity in the target bullet-screen comment display time period is greater than the preset target bullet-screen comment display quantity, retaining a target bullet-screen comment that is of the preset target bullet-screen comment display quantity and that is covered by the target bullet-screen comment display time period in the bullet-screen comment list; and in response to determining that the target bullet-screen comment quantity in the target bullet-screen comment display time period is not greater than the preset target bullet-screen comment display quantity, retaining a target bullet-screen comment covered by the target bullet-screen comment display time period in the bullet-screen comment list.

15. The computing device according to claim 10, wherein before the processing the target bullet-screen comment in the bullet-screen comment list based on the wave peak moment, the method further comprises:

determining whether a target bullet-screen comment quantity at the wave peak moment is greater than or equal to a third preset threshold;

in response to determining that the target bullet-screen comment quantity at the wave peak moment is greater than or equal to the third preset threshold, retaining the wave peak moment; and in response to determining that the target bullet-screen comment quantity at the wave peak moment is less than the third preset threshold, deleting the wave peak moment.

16. The computing device according to claim 10, wherein before the determining a target bullet-screen comment quantity of the media resource in each unit of time based on the release time of the target bullet-screen comment in the bullet-screen comment list, the method further comprises:

counting a total quantity of bullet-screen comments and a total quantity of target bullet-screen comments that are in the bullet-screen comment list;

calculating a target bullet-screen comment ratio based on the total quantity of target bullet-screen comments and the total quantity of bullet-screen comments;

in response to determining that the target bullet-screen comment ratio is greater than or equal to a first preset threshold, determining the target bullet-screen comment quantity of the media resource in each unit of time based on the release time of the target bullet-screen comment in the bullet-screen comment list; and in response to determining that the target bullet-screen comment ratio is less than a first preset threshold, deleting all target bullet-screen comments in the bullet-screen comment list.

17. The computing device according to claim 10, wherein before the calculating a wave peak moment of the target bullet-screen comment based on the target bullet-screen comment quantity in each unit of time, the method further comprises:

calculating a target bullet-screen comment distribution standard deviation of the target bullet-screen comment in the media resource based on the target bullet-screen comment quantity in each unit of time;

in response to determining that the target bullet-screen comment distribution standard deviation is greater than or equal to a second preset threshold, calculating a wave peak moment of the target bullet-screen comment based on the target bullet-screen comment quantity in each unit of time; and in response to determining that the target bullet-screen comment ratio is less than a second preset threshold, deleting all target bullet-screen comments in the bullet-screen comment list.

18. A non-transitory computer storage medium, wherein the storage medium stores one or more programs comprising instructions that, when executed by one or more processors of a computing device, cause the computing device to perform operations comprising:

obtaining a bullet-screen comment list corresponding to a media resource based on a playback request of the media resource;

determining a target bullet-screen comment quantity of the media resource in each unit of time based on a release time of a target bullet-screen comment in the bullet-screen comment list;

calculating a wave peak moment of the target bullet-screen comment based on the target bullet-screen comment quantity in each unit of time;

processing the target bullet-screen comment in the bullet-screen comment list based on the wave peak moment comprising:

determining a target bullet-screen comment display time period and a target bullet-screen comment silence time period that are in the media resource based on a target bullet-screen comment display rule and the wave peak moment; and retaining a target bullet-screen comment covered by the target bullet-screen comment display time period in the bullet-screen comment list, and deleting a target bullet-screen comment covered by the target bullet-screen comment silence time period in the bullet-screen comment list; and in response to determining that the media resource is played, returning a processed bullet-screen comment list to display a bullet-screen comment in the processed bullet-screen comment list in a playback process of the media resource.

\* \* \* \* \*